(12) United States Patent
Felber

(10) Patent No.: US 8,635,747 B2
(45) Date of Patent: Jan. 28, 2014

(54) CLAMPING DEVICE FOR BRIDGING TWO ELEMENTS WHICH CAN BE BROUGHT CLOSER TO EACH OTHER

(76) Inventor: Winfried Felber, Monheim (DE)

( * ) Notice: Subject to any disclaimer, the term of this patent is extended or adjusted under 35 U.S.C. 154(b) by 594 days.

(21) Appl. No.: 12/926,239

(22) Filed: Nov. 4, 2010

(65) Prior Publication Data
US 2011/0099767 A1 May 5, 2011

(30) Foreign Application Priority Data
Nov. 5, 2009 (DE) .................... 20 2009 014 968 U

(51) Int. Cl.
*F16L 33/08* (2006.01)
(52) U.S. Cl.
USPC .............................. 24/274 R; 24/282; 24/284
(58) Field of Classification Search
USPC ............ 24/274 R, 274 P, 274 WB, 21, 20 TT, 24/20 LS, 28, 282, 284
See application file for complete search history.

(56) References Cited

U.S. PATENT DOCUMENTS

| | | | | |
|---|---|---|---|---|
| 1,070,497 A * | 8/1913 | Lewis | | 24/21 |
| 1,999,683 A * | 4/1935 | Borresen | | 24/275 |
| 3,747,172 A * | 7/1973 | Tarzian | | 24/274 R |
| 3,769,665 A * | 11/1973 | McKown, Jr. | | 24/274 R |
| 4,521,940 A * | 6/1985 | Oetiker | | 24/20 LS |

\* cited by examiner

*Primary Examiner* — Robert J Sandy
(74) *Attorney, Agent, or Firm* — Bacon & Thomas, PLLC

(57) ABSTRACT

A clamping device (1) for bridging two elements (2*a*, 2*b*, 200*a*), which can be brought closer to each other, with at least one tensioning belt (6, 60) connected with an element (2*a*, 200*a*). The tensioning belt engages into an allocated turnbuckle (4) connected with the other element (2*b*) and is movable with it. The tensioning belt (6, 60) and the turnbuckle (4) are each mountable on the allocated element (2*a*, 2*b*, 200*a*) by a positive plug-in connection. The elements, which can be brought closer to each other (2*a*, 2*b*, 200*a*), are provided with formed retaining structure (10, 100) defined as projections emerging from their plane. The end portion of the tensioning belt (6, 60) facing away from the turnbuckle (4) and a turnbuckle belt (5) defined as a belt lug being applied on the turnbuckle (4) and in opposite direction to the tensioning belt (6, 60) are provided with counter-retaining structure (13, 130) which can be attached on the retaining means (10, 100) of the elements.

11 Claims, 6 Drawing Sheets

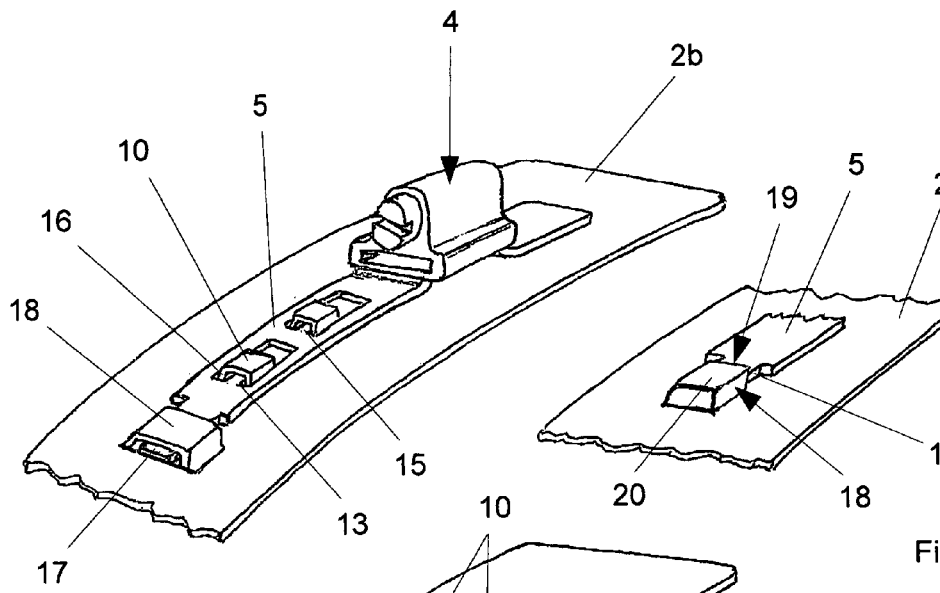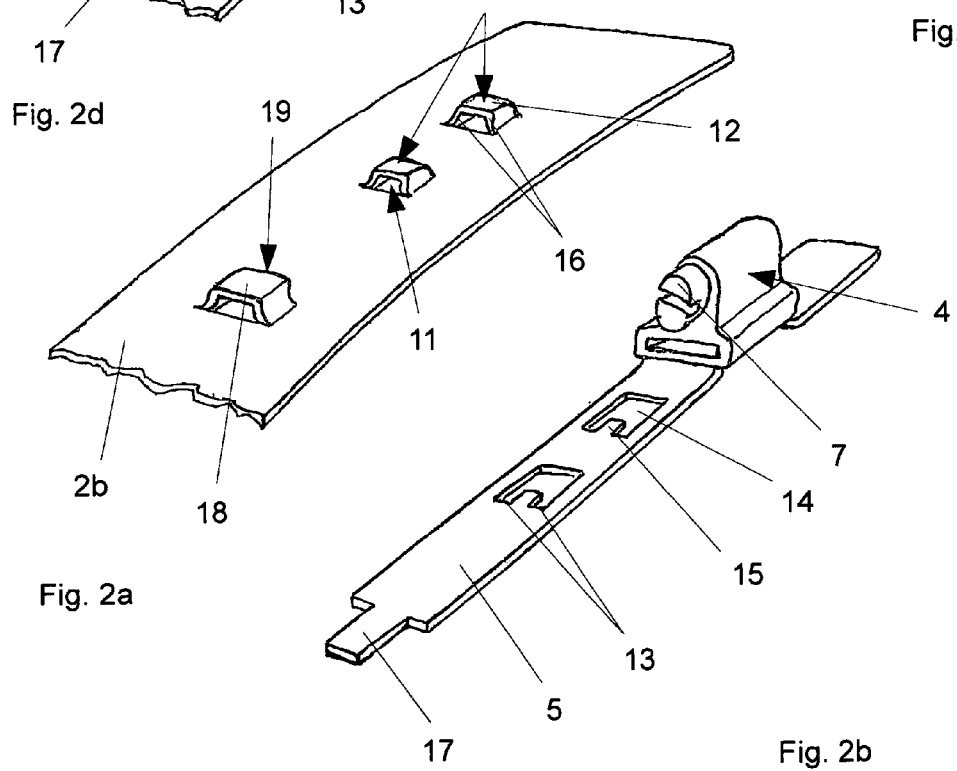

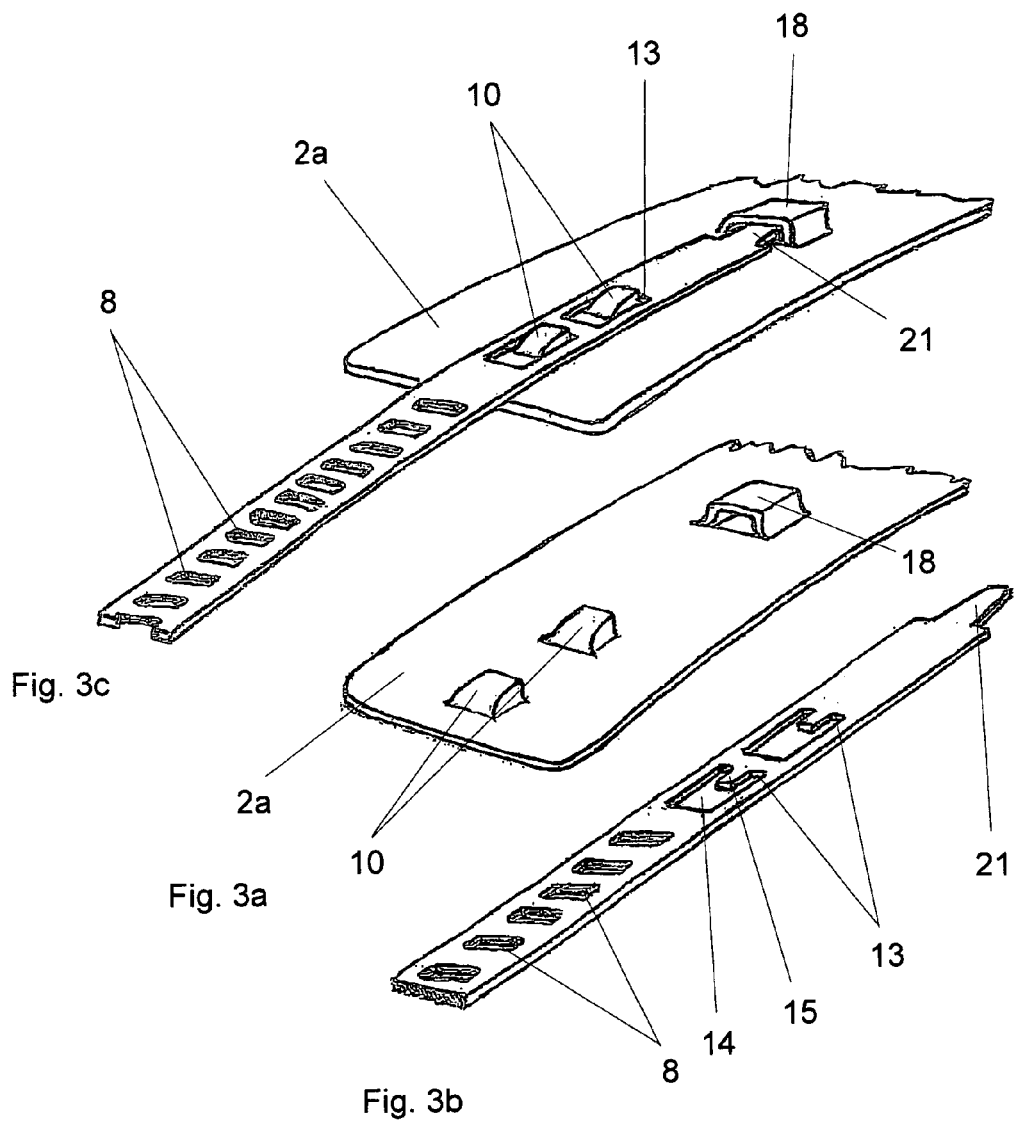

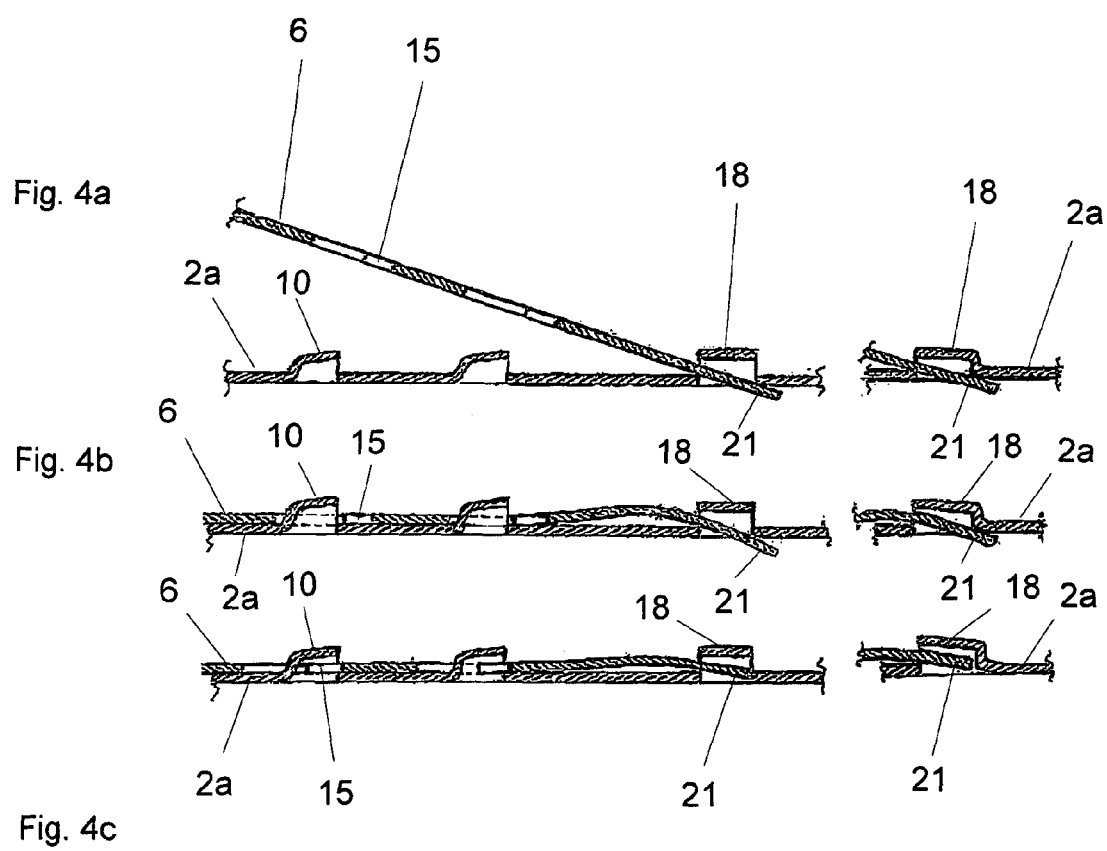

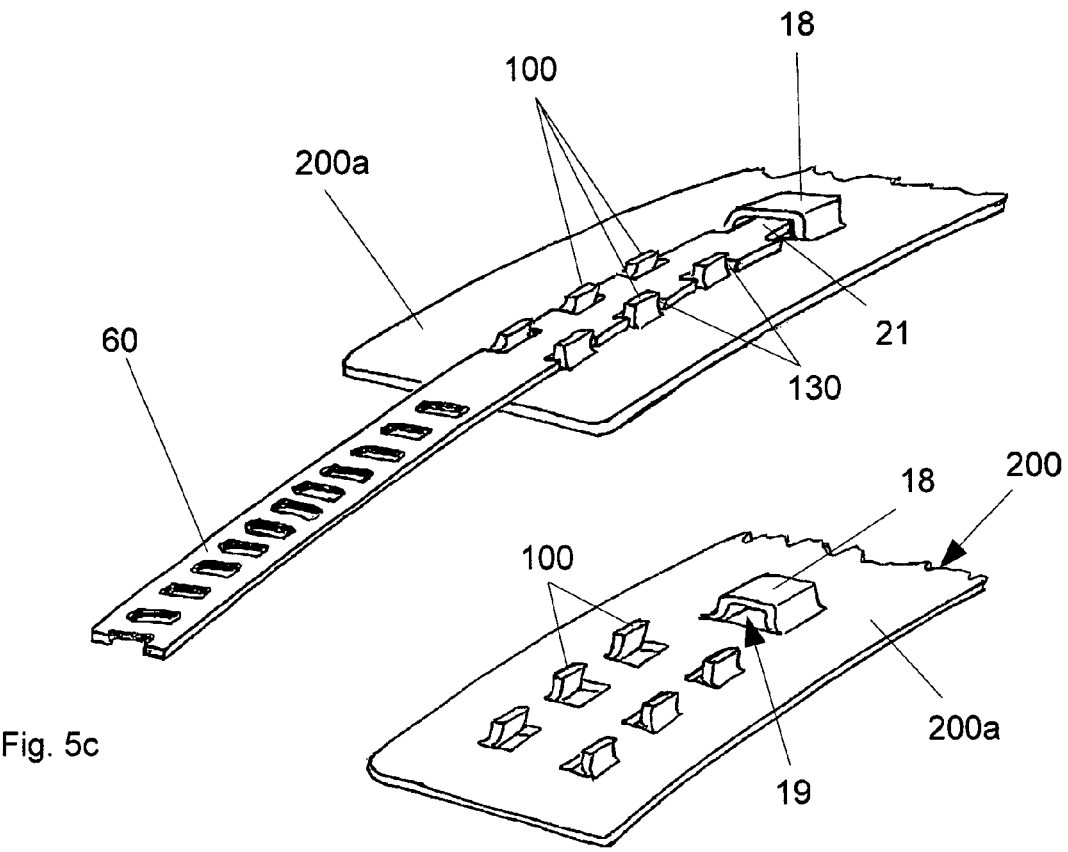
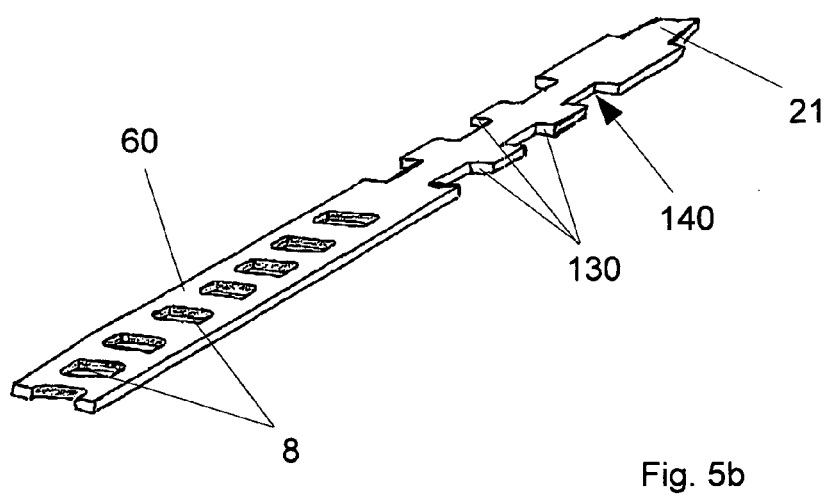
Fig. 5c
Fig. 5a
Fig. 5b

CLAMPING DEVICE FOR BRIDGING TWO ELEMENTS WHICH CAN BE BROUGHT CLOSER TO EACH OTHER

FIELD OF THE INVENTION

The invention relates to a clamping device for bridging two elements which can be brought closer to each other with at least one tensioning belt connected with an element which tensioning belt is engaged into an allocated turnbuckle connected with the other element and is movable with it.

BACKGROUND OF THE INVENTION

Clamping devices of this type are generally known. Such clamping devices, also called clamping rings or similar, are often mounted on hoses or pipes in order to fasten them on another object. Moreover, such clamping devices are used for connecting elements by means of which two pipes, for example, are to be connected with each other. The clamping device often has a tightening strap with a tensioning belt fastened on it, and a turnbuckle into which the tensioning belt is inserted. By means of a clamping screw on the turnbuckle, which by its worm thread is in direct contact with a gearing of the tensioning belt, the clamping device is clamped on its ends. Fastening of the tensioning belt and the turnbuckle on the allocated tightening strap end is made until now by means of welding, riveting or clinching.

By welding and riveting, however, there is a high risk of corrosion, i.e., the joint may rust so that stability of the connections tensioning belt-tightening strap and turnbuckle-tightening strap is considerably reduced. In ox clinching there is the problem that the stamp provided for creation of the connection of two elements introduced into the die is subject to wear so that the safety to be achieved is reduced with increasing number of joints. Moreover, the required tools (stamp, die etc.) are complex in manufacture and expensive.

SUMMARY OF THE INVENTION

It is therefore the objective of the present invention to provide a clamping device, which avoids the above mentioned drawbacks, which is easily mountable and guarantees a high level of safety.

According to the invention this is solved by the tensioning belt and the turnbuckle each being mountable on the allocated element by a positive plug-in connection, that the elements, which can be brought closer to each other, are provided with formed retaining means defined as projections emerging from their plane, and that the end portion of the tensioning belt facing away from the turnbuckle and a turnbuckle belt defined as a belt lug being applied on the turnbuckle and in opposite direction to the tensioning belt are provided with counter-retaining means which can be attached on the retaining means of the elements.

The tensioning belt and the turnbuckle by connection of counter-retaining means with retaining means of the elements are fastened on the latter so that a releasable positive plug-in connection is achieved. This plug-in connection permits an easy handling and guarantees a safe connection of the respective parts with each other. The risk of rusting of the joint can be avoided by preventing changes in material of the parts to be connected whereby stability of the connections can be maintained consistently for several years. Moreover, the connection of tensioning belt and turnbuckle resp. with the allocated element can be made rapidly and easily so that it can be done by any individual. Thus, it is no longer necessary that such parts must already be pre-assembled prior to installation. Moreover, no tools or specific equipment are required for mounting the tensioning belt and the turnbuckle on the allocated element because the end portion of the tensioning belt as well as a turnbuckle belt being applied on the turnbuckle are simply attached on the retaining means of the elements by means of their counter-retaining means, and are thus securely fastened on the element.

The clamping device according to the invention is suitable for different applications. For example, apart from fastening hoses on a fitting in any fields, it may also be used in civil engineering or in the automotive industry. Thus, the positive plug-in connection permits an easy handling and a high level of safety. Moreover, an easy manufacture by stamping and deep drawing is possible.

It may be advantageous, if the retaining means are formed to the elements, which can be brought closer to each other, and the counter-retaining means to the tensioning belt and to the turnbuckle belt. Thus, retaining means and counter-retaining means can be created by simple means.

It may be particularly advantageous, if the retaining means are defined as formed hoods. Thus, the counter-retaining means can be securely attached and retained on the hoods.

In order to prevent even more systematically that the counter-retaining means of the tensioning belt and/or turnbuckle belt are lifted off the retaining means of the elements, it can be provided that the counter-retaining means are defined by stop edges extending transversely to the tensioning direction flanking a tongue which can be introduced into the allocated hood. The hoods and the tongues engaged into the hoods result in a mutual catching so that the tensioning belt and the turnbuckle belt abut securely on a tightening strap of the clamping device provided advantageously as an element, and an even more secure positive plug-in connection is guaranteed. Transmission of force can here be distributed on several locations of the tensioning belt and/or the turnbuckle belt, namely on the stop surfaces flanking the tongue as well as on the tongue end.

The hood upper surface can advantageously be lowered in tensioning direction whereby it can be guaranteed that the tensioning belt and the turnbuckle belt are pressed onto the allocated element when the tongues are inserted into the retaining means so that a close fit of tensioning belt and turnbuckle belt on the allocated element results.

In another advantageous embodiment of the invention it can be provided that the ends of the tensioning belt and the turnbuckle belt facing away from the turnbuckle are each arranged with a fixing tongue to which a catch hood each of the allocated element is attributed having an opening facing towards the opposite element in each case. The fixing tongue prevents here that the tensioning belt and/or turnbuckle belt is lifted off the allocated element so that a projection of the end portion of the tensioning belt and/or turnbuckle belt can be advantageously avoided.

Moreover, it can be particularly advantageous, if the length of the fixing tongue is greater than the length of the tongues provided in the area of the counter-retaining means, with the excess length corresponding at most to the clear inner length of the hoods acting as retaining means, and with the fixing tongue snapping into the allocated catch hood with tongues introduced into the hoods acting as retaining means and attributed to the counter-retaining means. By the fact that the fixing tongue in the end position snaps into the allocated hood, the fixing tongue is at the same height as the front belt areas which is beneficial to a close fit with the element.

Other advantageous embodiments and other convenient further embodiments of the generic steps are specified in the remaining dependent claims and are described in detail in the following examples by means of the drawing. The above mentioned features and features of the invention still to be explained cannot only be used in the combination specified in the claims but also in any other combination without abandoning the scope of the invention.

BRIEF DESCRIPTION OF PREFERRED EMBODIMENTS

FIG. 1a is a perspective view of two clamping devices used together.

FIG. 2a to 2c are perspective views of individual parts of a turnbuckle portion;

FIG. 2d is a perspective view of a turnbuckle in a condition fastened to an element of the clamping device;

FIG. 3a, 3b are perspective views of the individual parts of a tensioning belt end portion;

FIG. 3c is a perspective view of a tensioning belt end portion in a condition fastened to an element of the clamping device;

FIGS. 4a to 4c show the mounting steps for fastening the tensioning belt to an allocated element; and FIG. 5a-5c are perspective views of another embodiment of the clamping device according to the invention.

DESCRIPTION OF PREFERRED EMBODIMENTS

The main field of application of the invention is above all the waste water and sanitary field when pipes are connected with each other. But the clamping device can also be used in automotive engineering or mechanical engineering but it is not limited to these fields.

Figure 1:
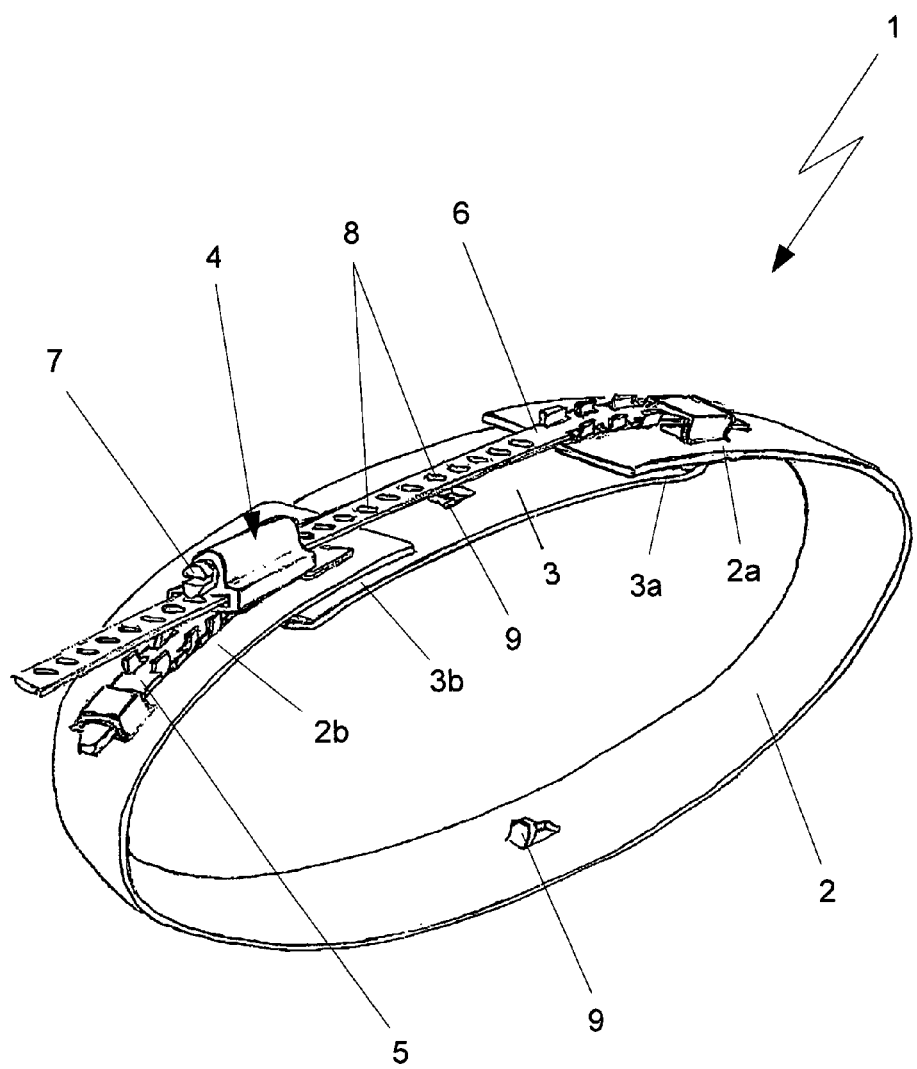
FIG. 1 is a perspective view of a clamping device according to the invention.
Figure 1:
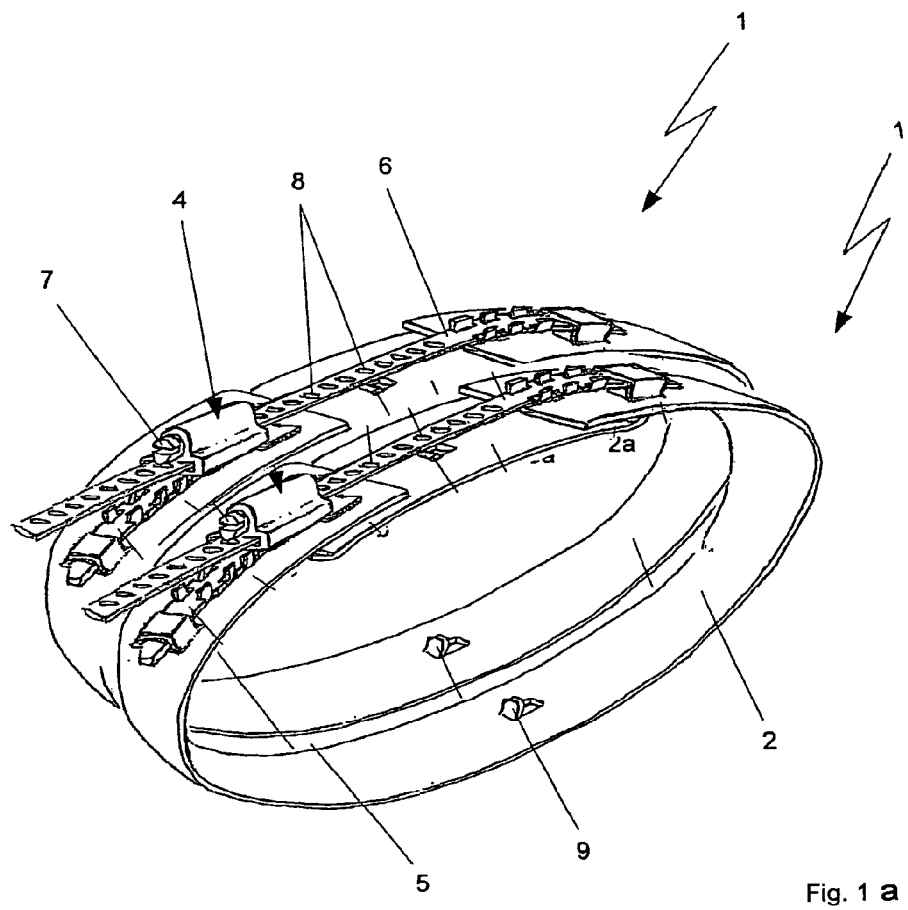

Arrangement of a clamping device 1 is explained according to FIG. 1 by means of an element 2 defined as a tightening strap. The tightening strap 2 can be of one-piece and formed circumferential over the entire circumference. It is preferably made from steel or plastic. But a multi-part embodiment of the tightening strap 2 according to FIG. 1 is preferred. The tightening strap 2 shown here comprises an insert strap 3 in addition, which is inserted into the tightening strap 2, so that ends 2a, 2b and 3a, 3b of the two straps 2, 3 overlap. The end 2b of the tightening strap 2 is provided with a turnbuckle 4 in connection with a turnbuckle belt 5 defined as a belt lug applied on the turnbuckle 4, with the end 2a being provided with a tensioning belt 6.

The turnbuckle 4 is formed as a worm shaft operable via a screw head 7, the teeth of the worm shaft engaging into recesses 8 provided in the tensioning belt 6 such that in case of a rotation, the ends 2a and 2b of the tightening strap 2 are pulled against each other or released from each other, if the clamping device 1 is attached to or removed from an object to be fastened by it, such as for example a hose to be fastened but also a fixing collar and/or sealing collar.

The tightening strap 2 and insert strap 3 each comprise a formed positioning element 9 defined as a projection protruding towards the inside and/or as a bent projection. The two positioning elements 9 are formed on the tightening strap 2 and on the insert strap 3 such that they are almost opposite to each other. These positioning elements 9 preferably stamped out are supposed to hold in position the clamping device 1 on a hose or a fixing collar and/or sealing collar by their engagement into these, with the positioning elements 9 being formed on the tightening strap 2 and on the insert strap 3 such that when tightening the tensioning belt 6 the circular configuration of the tightening strap 2, 3 is advantageously maintained.

Figure 1a shows the use of two identical clamping devices. It should be noted, that any number of identical clamping devices can be used together.

FIGS. 2a and 2d each show individually the elements tightening strap end 2b and turnbuckle 4 in connection with the turnbuckle belt 5 and the positive connection of these elements 2b, 4 and 5 with each other. As can be taken from FIG. 2a, end 2b of the tightening strap 2 comprises retaining means 10 defined as projections protruding from their plane. The retaining means 10 are formed centrally to the tightening strap end 2b and are configured here advantageously as hoods designed as bulged out embossings. The hoods 10 provided on the side of the tightening strap 2 are configured here as pockets open on one side, the openings 11 of which are facing away from the opposite tightening strap end 2a. Moreover, an upper surface 12 of the hoods 10 is lowered in tensioning direction as is illustrated more clearly in FIG. 3a.

According to FIG. 2b, a turnbuckle belt 5 is engaged in the turnbuckle 4. The turnbuckle belt 5 is provided with counter-retaining means 13 attachable on the retaining means 10 configured as hoods on the side of the tightening strap. As can be seen, the counter-retaining means 13 are formed centrally to the turnbuckle belt 5. In order that the counter-retaining means 13 are securely retained in their attached position on the hoods 10, they are defined by stop edges extending transversely to the tensioning direction which flank a tongue 15 to be introduced into the allocated hood 10 of the tightening strap end 2b. For defining the counter-retaining means 13 and the tongues 15, the turnbuckle belt 5 is provided with U-shaped cutouts. In the attached condition of a counter-retaining means 13 on the allocated hood 10, the tongue 15 engages into the interior of the hood 10 defined as a pocket, with the stop edges 13 abutting the side walls 16 of the hood 10 as a limitation, as is illustrated in FIG. 2d.

Moreover, the end of the turnbuckle belt 5 facing away from the turnbuckle 4 comprises a fixing tongue 17 protruding centrally from the turnbuckle belt 5. A catch hood 18 of the tightening strap end 2b is allocated to the fixing tongue 17, as can be seen in FIGS. 2a and 2c, comprising an opening facing to the tightening strap end 2b of the tightening strap 2. For an easier identification of the fixing tongue 17 in the catch hood 18, the catch hood 18 is shown open towards both sides in FIGS. 2a and 2d, only in FIG. 2c the catch hood 18 is shown accordingly with only one opening 19. The catch hood 18 can be configured as a pocket open on one side with an upper surface 20 lowered opposite to the tensioning direction, as can be seen in FIG. 2c. The length of the fixing tongue 17 of the turnbuckle belt 5 is greater than the length of the tongues 15 provided in the area of the counter-retaining means 13 with the excess length corresponding at most to the clear inner length of the hoods 10 acting as retaining means 10. As is shown in FIGS. 2c and 2d, the fixing tongue 17, when counter-retaining means 13 are attached on the hoods 10 acting as retaining means 10, engages into the catch hood 18, thus guaranteeing a close fit of the turnbuckle belt 5 to the tightening strap 2. Moreover, thus it is advantageously prevented that the turnbuckle belt 5 is lifted off the tightening strap 2.

The FIGS. 3a to 3c show the tensioning belt 6 and the tightening strap end 2a individually and in connection with each other. The same parts as in FIGS. 2a to 2d have the same reference numerals here as well. The tightening strap end 2a also comprises the formed retaining means 10 configured as projections and having the shape of hoods like the tightening strap end 2b. The lowered top surface of the hood 10 is particularly clearly visible in FIG. 3b. Moreover, the tightening strap end 2a also comprises a catch hood 18 for receiving a fixing tongue 21 of the tensioning belt 6 which, according to FIG. 3b, is slightly tapered towards its end. But it may also comprise a rectangular shape like the fixing tongue 17 of the turnbuckle belt 5. But it shall not be excluded either that the fixing tongue 17 of the turnbuckle belt 5 is not tapered towards its end as well. According to FIG. 3b the tensioning belt 6 is likewise provided with counter-retaining means 13 in the form of stop edges flanking a tongue 15 which can be introduced into the allocated hood 10 of the tightening strap end 2a. As has already been explained with respect to FIG. 1, moreover the tensioning belt 6 comprises the recesses 8 into which teeth of the worm shaft of the turnbuckle 4 engage when the tensioning belt 6 is tightened. In FIG. 3c the positive plug-in connection as such is shown. As can be seen, also here the tongues 15 engage into the interior spaces of the hoods 10 configured as pockets open on one side, so that the stop edges 13 configured as counter-retaining means abut on the front side wall surfaces 16 of the hoods 10 and/or introduction of the tongues 15 into the hoods 10 is limited by means of the stop edges 14. The counter-retaining means 13 are thus attached and secured on the hoods 10 configured as retaining means 10. At the same time the fixing tongue 21 engages into the catch hood 18 of the tightening strap end 2a. Thus, a lifting off of the end of the tensioning belt 6 is advantageously prevented.

As FIGS. 2a to 2d and 3a to 3c show in connection with FIG. 1, the hoods 10 of the ends 2a and 2b of the tightening strap 2 opposite to each other are mirror-inverted with respect to a plane extending in parallel to the tensioning direction.

FIGS. 4a to 4c show the approach when the tensioning belt 6 is mounted on the tightening strap end 2a. The turnbuckle belt 5 with turnbuckle 4 is mounted on the tightening strap end 2b in the same way. On the right of the individual FIGS. 4a, 4b and 4c the area of the catch hood 18 is shown in each case more in detail. As is shown in FIG. 4a, at first the fixing tongue 21 of the tensioning belt 6 is inserted into the catch hood 18 such that the front area of the fixing tongue 21 comes to rest below the tightening strap 2. Subsequently the individual U-shaped cutouts 14 of the tensioning belt 6 are placed over the hoods 10, with simultaneously the end of the fixing tongue 21 being pressed onto the underside of the tightening strap 2 and bulged in the area before the catch hood 18 of the tensioning belt 6, as can be seen in FIG. 4b. After the hoods 10 of the tightening strap 2 come to rest in the U-shaped cutouts 14 of the tensioning belt 6, the tongues 15 are introduced through the respective opening 11 into the hoods 10 configured as pockets open on one side until the counter-retaining means 13 defined as stop edges abut the front side wall surfaces 16 of the hoods 10, as can be seen in FIG. 4c. Due to the lowered surface of the hoods 10, it is guaranteed here that the tensioning belt 6 during insertion of the tongues 15 into the hoods 10 is pressed onto the tightening strap 2. The tensioning belt 6 directly abuts the tightening strap 2 as a result. By engagement of the tongues 15 into the hoods 10, the latter are caught with each other so that it is guaranteed that the tensioning belt 6 is securely mounted on the tightening strap 2 and cannot be detached unwanted. At the same time, the fixing tongue 21 due to displacement of the tensioning belt 6 snaps into the catch hood 18 from the bottom whereby the fixing tongue 21 in the final position is located at the same height as the front belt area thus preventing a lifting off of the tensioning belt 6 from the tightening strap 2. In this way, the tensioning belt 6 can be fastened to the tightening strap 2 by simple moves without special mounting tools being necessary. Moreover, the clamping device 1 can advantageously be mounted on site so that pre-assembly and subsequent special shipping can be avoided.

FIGS. 5a to 5c represent another embodiment of the retaining means of the tightening strap and the counter-retaining means of the tensioning belt. The turnbuckle belt and the tensioning belt can be configured in the same way. The same parts as in FIGS. 2a to 2d have the same reference numerals here as well. FIG. 5a shows an end 200a of a tightening strap 200 on which retaining means 100 having the shape of formed retaining lugs are provided. Several retaining lugs 100, preferably six retaining lugs 100, are formed on the tightening strap end 200a, with two lines in parallel to each other with three retaining lugs 100 each being provided. A catch hood 18 for receiving the fixing tongue 21 of a tensioning belt 60 shown in FIG. 5b is likewise formed accordingly on the tightening strap end 200a. Apart from the recesses 8, the tensioning belt 60 is provided with counter-retaining means 130 which are attached on the retaining lugs 100 on the tightening strap side in order to fasten the tensioning belt 60 on the tightening strap 200. The counter-retaining means 130 are formed by stop edges of recesses 140 provided on the border and configured according to the retaining lugs 100. The number of recesses 140 corresponds to the number of retaining lugs 100 on the tightening strap 200.

For fastening the tensioning belt 60 on the tightening strap end 200a, the fixing tongue 21 of the tensioning belt 60 is inserted into the catch hood 18 of the tightening strap end 200a until the recesses 140 are located opposite the retaining lugs 100. Subsequently the tensioning belt 60 is lowered so that the retaining lugs 100 engage into the recesses 140. In this way, a positive plug-in connection can be achieved as well. A lifting off of the tensioning belt 60 from the tightening strap 200 can be prevented here by the fixing tongue 21 introduced into the catch hood 18.

Of course, it is possible to combine among each other the embodiments of the retaining means 10, 100 and the counter-retaining means 13, 130 described. Also, several parallel tensioning belts 6, 60 can be provided on the tightening strap 2, 200 which tensioning belts engage into correspondingly allocated turnbuckles 4 provided with turnbuckle belts 5.

The tensioning belt 6, 60 can be preferably formed here as a fixing collar configured as an annularly circumferential spring cage for fastening two pipes which can be connected to each other.

The invention shall not be limited to the embodiments of the clamping device 1 shown but numerous changes and modifications can be made with such modification, which are within the scope of protection of the attached claims, being included.

What is claimed is:

1. A clamping device for bridging two elements which can be brought closer to each other comprising:
at least one tensioning belt connected with one of said two elements; and
a turnbuckle connected with the other of said two elements, said tensioning belt is engaged into said turnbuckle and is movable with it, whereby the tensioning belt and the turnbuckle are each mountable on the allocated element by a positive plug-in connection, that the elements, which can be brought closer to each other, are provided with formed retaining means defined as projections emerging from their plane, and that the end portion of the tensioning belt facing away from the turnbuckle and a turnbuckle belt defined as a belt lug being applied on the turnbuckle and in opposite direction to the tensioning belt are provided with counter-retaining means which can be attached on the retaining means of the elements, whereby:

the ends of the tensioning belt and the turnbuckle belt facing away from the turnbuckle are each provided with a fixing tongue to which a catch hood each of the elements are allocated comprising an opening face towards the opposite element in each case;

the length of the fixing tongue is greater than the length of the tongue provided in the area of the counter-retaining means; and the excess length corresponds at most to the clear inner length of the hoods acting as retaining means, and that the fixing tongue snaps into the allocated catch hood when the tongues are introduced into the hoods, which act as retaining means, and are attributed to the counter-retaining means.

2. A device according to claim 1, whereby the retaining means are formed to the elements which can be brought closer to each other and the counter-retaining means are formed to the tensioning belt and to the turnbuckle belt.

3. A device according to claim 1, whereby the retaining means are defined as formed hoods.

4. A device according to claim 1, whereby the counter-retaining means are defined by stop edges extending transversely to the tensioning direction flanking each a tongue which can be introduced into the allocated hood.

5. A device according to claim 1, whereby the tensioning belt and the turnbuckle belt are provided with U-shaped cut-outs to form the counter-retaining means and tongues.

6. A device according to claim 1, whereby the hoods provided on the element side are defined as pockets open on one side, the opening of which is facing away from the opposite element.

7. A device according to claim 6, whereby the hoods of the elements opposite to each other are mirror-inverted with respect to a plane extending transversely to the tensioning direction.

8. A device according to claim 1, whereby the upper surface of the hoods is lowered in tensioning direction.

9. A device according to claim 1, whereby the elements, which can be brought closer to each other, are formed by the ends of a tightening strap which are opposite to each other.

10. A device according to claim 1, whereby several parallel tensioning belts are provided.

11. A device according to claim 1, whereby the tightening strap is formed as a fixing collar configured as a spring cage for fastening two pipes which can be connected to each other.

* * * * *